(12) United States Patent
Federici et al.

(10) Patent No.: US 7,644,815 B2
(45) Date of Patent: Jan. 12, 2010

(54) UNIT FOR CONVEYING PACKS OF TOBACCO PRODUCTS

(75) Inventors: Luca Federici, Bologna (IT); Francesco Milandri, Cesena (IT); Stefano Negrini, Calderara di Reno (IT)

(73) Assignee: G.D. S.p.A. (IT)

( * ) Notice: Subject to any disclaimer, the term of this patent is extended or adjusted under 35 U.S.C. 154(b) by 0 days.

(21) Appl. No.: 11/189,772

(22) Filed: Jul. 27, 2005

(65) Prior Publication Data
US 2006/0070354 A1    Apr. 6, 2006

(30) Foreign Application Priority Data
Aug. 3, 2004  (IT)  .......................... BO2004A0494

(51) Int. Cl.
*B65B 35/26*  (2006.01)
*B65B 23/00*  (2006.01)

(52) U.S. Cl. ................ 198/608; 198/419.3; 198/461.1; 198/471.1

(58) Field of Classification Search .................. 198/607, 198/608, 612, 614, 601, 419.1, 461.1, 471.1
See application file for complete search history.

(56) References Cited

U.S. PATENT DOCUMENTS

| | | | | |
|---|---|---|---|---|
| 2,603,395 | A | * | 7/1952 | Molins et al. .................. 53/250 |
| 4,558,779 | A | | 12/1985 | Schmitt |
| 5,186,310 | A | | 2/1993 | Winchester |
| 5,358,093 | A | * | 10/1994 | Gigante et al. ........... 198/418.7 |
| 5,971,133 | A | * | 10/1999 | Wilkins .................. 198/370.09 |
| 6,425,476 | B2 | * | 7/2002 | Ghiotti et al. ............... 198/426 |
| 6,690,996 | B2 | * | 2/2004 | Seiler .......................... 700/228 |

FOREIGN PATENT DOCUMENTS

| | | |
|---|---|---|
| DE | 29521082 U1 | 8/1996 |
| DE | 29817239 U1 | 11/1998 |
| EP | 0613838 | 9/1994 |
| EP | 0709315 | 5/1996 |

* cited by examiner

*Primary Examiner*—Gene Crawford
*Assistant Examiner*—Kavel P Singh
(74) *Attorney, Agent, or Firm*—Timothy J. Klima; Shuttleworth & Ingersoll, PLC

(57) ABSTRACT

Packets of cigarettes are conveyed from a packer to a cellophaner by a unit utilizing a first pocket conveyor connected to the infeed of the cellophaner, and a second pocket conveyor by which packets are directed onto the first conveyor at a transfer point; the unit is also equipped with a sensor that will check whether or not each pocket of the second conveyor is occupied by a packet, and a placement mechanism, interlocked to the sensor, of which the function is to fill any empty pockets of the first conveyor with packets recycled from the cellophaner.

13 Claims, 5 Drawing Sheets

UNIT FOR CONVEYING PACKS OF TOBACCO PRODUCTS

This application claims priority to Italian Patent Application No. BO2004A000494, filed Aug. 3, 2004, which is incorporated by reference herein.

BACKGROUND OF THE INVENTION

The present invention relates to a unit for conveying products.

In particular, the present invention relates to a unit for conveying products to a user machine, and more exactly a unit comprising a first and a second conveyor set in continuous motion.

The invention finds application, to advantage, in the art field of conveying systems for packets of cigarettes, to which reference is made explicitly in the specification albeit implying no limitation in scope.

In a typical cigarette packaging line, packets turned out by a cigarette packer are directed into a cellophaner, which proceeds to envelop each one in an overwrapping of polypropylene; the packets are supplied to the cellophaner by a first conveyor carrying the main flow from the packer, randomly spaced, and by a second recycle conveyor or hopper, which carries unblemished packets readmitted to the production cycle upstream of the cellophaner.

The readmission step is made necessary for one reason more than any other, namely that to operate correctly, the user machine must be supplied with packets in a continuous and ordered succession, whereas in practice it can happen that gaps will appear in the flow of packets proceeding toward the cellophaner, and in consequence empty spaces on the conveyor, attributable to various different causes.

Owing to constraints determining the way that the outfeed conveyor of the cigarette packer and the infeed conveyor of the cellophaner are positioned in space, the path followed by the aforementioned first or main conveyor will generally incorporate 90° and 180° bends and changes of level, and it is therefore normal for the conveying path to include curvilinear stretches along which the packets are directed downwards toward the cellophaner. These non-rectilinear stretches of the conveying path can cause damage to packets propelled forward at the high operating speeds of modern cigarette packers. In effect, the packets advance broadside along the rectilinear sections of the path, proceeding in close order with one larger side face resting on the belt of the conveyor, and are caused to strike one against another when passing through the bends and down the gradients of the path. In particular, it will often happen that the corner of one packet rubs against the flank face of the packet in front, generating wear.

A further problem connected with random spacing of the packets is that the dynamic by which they are carried along the path cannot be controlled, so that it is not possible to apply additional items to the packets, such as coupons and/or leaflets, before their entry into the cellophaner.

Positioned generally alongside the main conveyor, the recycle hopper containing readmissible packets is associated with a push rod designed to eject the lowest packet from the hopper and direct it onto the main conveyor whenever there is a gap in the flow of packets advancing on the selfsame conveyor.

More particularly, given that the packets do not advance in a regularly spaced succession, it is not possible with this type of feed system to predict when there are going to be gaps on the conveyor, and the recycle hopper comes into operation only when the cigarette packer is at standstill. Even with the recycle hopper installed and in operation, consequently, there will always be unpredictable gaps in the flow of packets directed along the main conveyor toward the cellophaner, and the resulting empty spaces reduce the efficiency of the machine considerably.

Attempts have been made to avoid damage to the packets along the non-rectilinear stretches of the main conveyor, by employing conveyors on which the selfsame packets are fed to the cellophaner in a regularly spaced succession, each one occupying a stable position determined by a relative projection or ridge on the surface on the conveyor.

A solution of this type precludes the use of the conventional recycle hopper to readmit unblemished packets as described above, since, at the high operating speeds of the user machine, the cycle time needed for a push rod to transfer a packet from the hopper to the main conveyor would be much longer than the time taken by the empty space to pass across the outlet of the selfsame hopper.

Solutions of other types would be notably complex from the constructional standpoint, inasmuch as they would be based on the use of a hopper capable of traversing parallel with the feed direction of the flow of packets and thus allowing the outlet to track the adjacent gap so that a recycled packet can be placed accurately in the required position.

The object of the present invention is to provide a conveying unit for products, presenting a first conveyor and a second conveyor feeding respective ordered flows of the products, such as will allow products missing from the first ordered flow to be made up with products from the second ordered flow, even at the high operating speeds of user machines, employing a device of simple and practical design.

Adopting a unit in accordance with the invention, in particular, any packets missing from the first ordered flow can be made up as the selfsame flow advances, without its progress being interrupted.

SUMMARY OF THE INVENTION

The stated object is realized according to the present invention in a unit for conveying products, comprising a first conveyor with pockets feeding a succession of products toward the user machine, a second conveyor with pockets feeding products onto the first conveyor at a transfer point, also sensing means serving to detect the presence of products in the pockets of the second conveyor, and placement means, interlocked to the sensing means, by which products can be directed into the pockets of the first conveyor so as to obtain an unbroken succession of products occupying the pockets of the first conveyor downstream of the transfer point.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
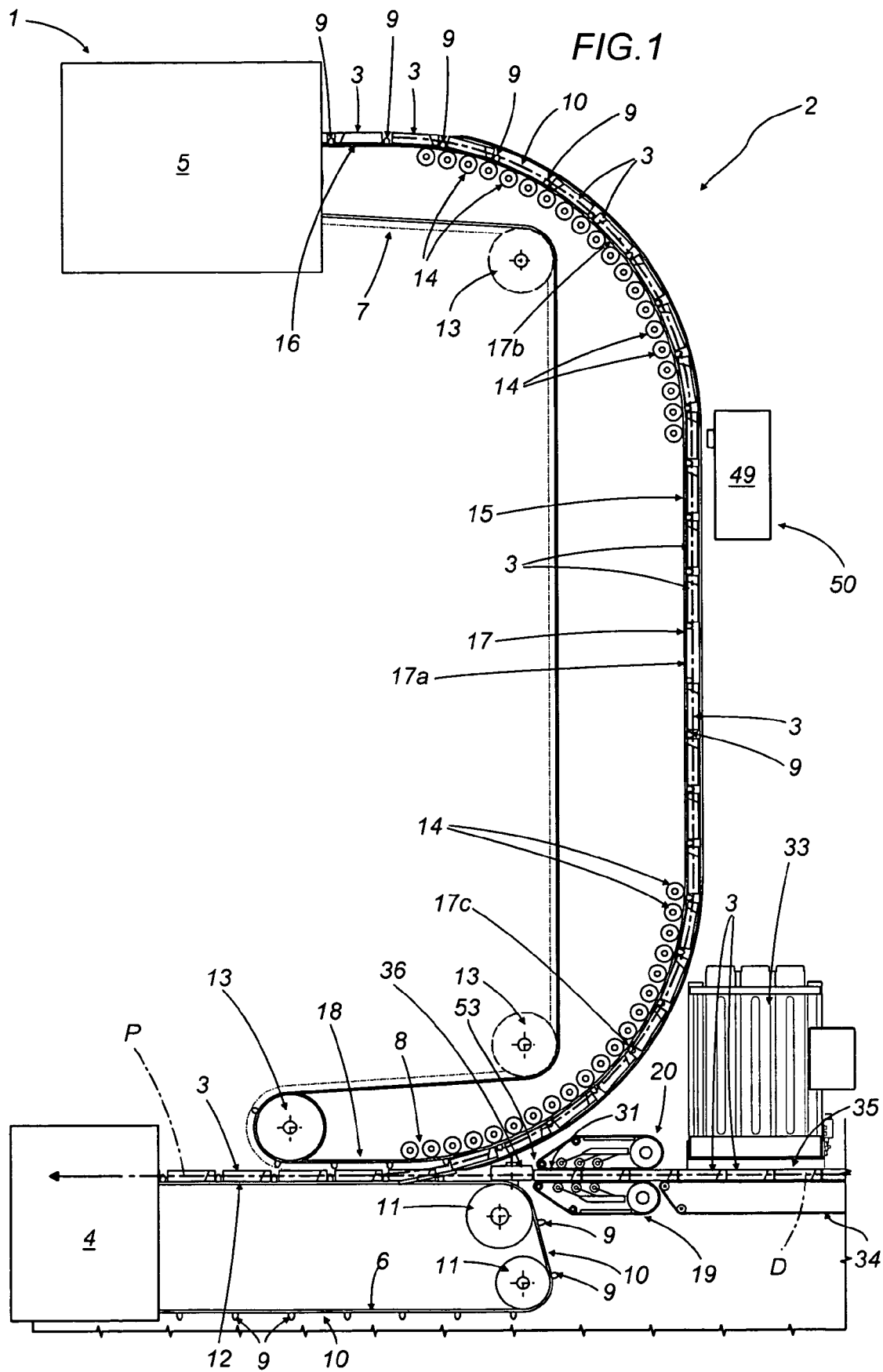
FIG. 1 shows a preferred embodiment of the unit for conveying products according to the present invention, viewed schematically in a side elevation with certain parts omitted in the interests of clarity.

Referring to FIG. 1, numeral 1 shows a portion of a cigarette packing line, in its entirety.

The line 1 in question comprises a unit 2 by which packets 3 of cigarettes are conveyed to a user machine such as a cellophaner, represented schematically in FIG. 1 by a block denoted 4.

The packets 3 are turned out by an upstream unit consisting for example in a cigarette packer, shown schematically in FIG. 1 as a block denoted 5, and directed along the conveying unit 2 following a feed path denoted P.

The conveying unit 2 includes a first conveyor 6, set in continuous motion, from which packets 3 are directed into the aforementioned user machine 4, and a second conveyor 7, likewise set in continuous motion, from which packets 3 are directed onto the first conveyor 6. In an alternative embodiment of the unit 2, the conveyors 6 and 7 might be driven intermittently.

The advancing packets 3 pass from the second conveyor 7 onto the first conveyor 6 at a transfer point denoted 8.

The first conveyor 6 consists in a belt conveyor of familiar type equipped with ridges 9 combining in pairs to create respective pockets 10, each one of which accommodates a single packet 3.

The first conveyor 6 is looped around a plurality of pulleys 11 of which at least one (not indicated) is a driving pulley, whilst the remainder are idle pulleys.

Only certain of the pulleys 11 are illustrated in the accompanying drawings.

The first conveyor 6 comprises a substantially horizontal top transport branch 12 extending along a rectilinear direction D and providing one segment of the feed path P along which the packets 3 are directed toward the cellophaner.

Like the first conveyor 6, the second conveyor 7 consists in a belt conveyor presenting ridges 9 that combine in pairs to establish a succession of pockets 10 each accommodating a single packet 3.

The second conveyor 7 is looped around a plurality of pulleys 13 and rollers 14.

Not all of the pulleys denoted 13 are illustrated in the accompanying drawings, and at least one (not indicated) is power driven whilst the remainder are idle pulleys.

The second conveyor 7, which occupies a position above the first conveyor 6, comprises a respective transport branch 15 composed of a horizontal upper infeed segment 16 on which the packets 3 emerging from the packer 5 are taken up, also a descending segment denoted 17, and a horizontal lower outfeed segment 18 facing the top transport branch 12 of the first conveyor 6 in the neighborhood of the transfer point 8.

The aforementioned descending segment 17 includes a substantially vertical rectilinear portion 17a, and two curvilinear connecting portions 17b and 17c merged respectively with the horizontal upper and lower segments 16 and 18.

Figure 2:
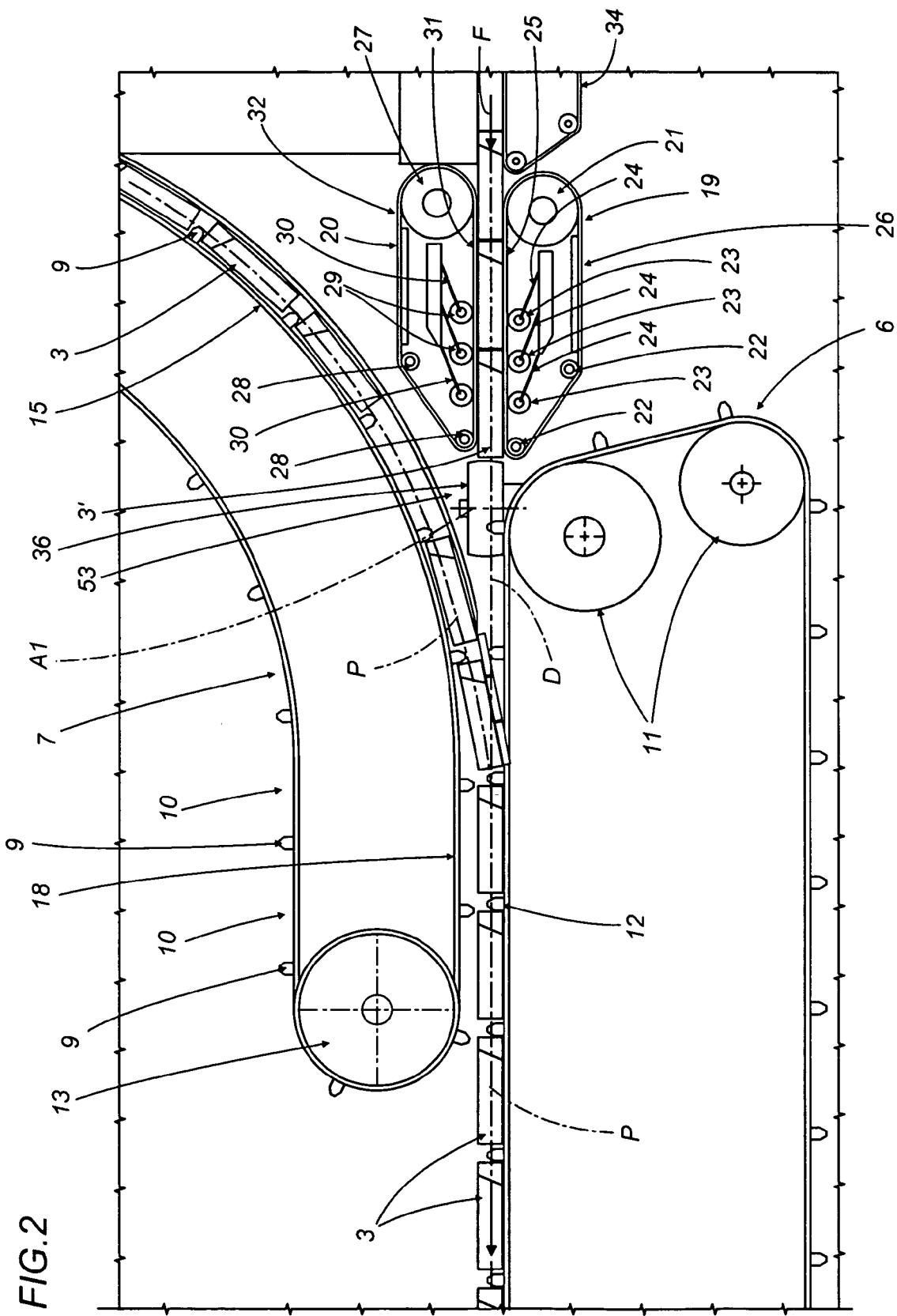
FIG. 2 shows a detail of the unit in FIG. 1, viewed schematically in a side elevation and in a different operating situation.

Referring to FIGS. 1 and 2, the unit 2 further comprises a third belt conveyor and a fourth belt conveyor, denoted 19 and 20 respectively.

As illustrated in FIG. 2, the third conveyor 19 is looped around a driving pulley 21 and around a plurality of idle rollers 22 and 23, the rollers denoted 22 occupying fixed positions, the rollers denoted 23 mounted flexibly to respective spring elements 24.

The third conveyor 19 presents an active top branch 25 running in the direction of the arrow F in FIG. 2, and a bottom return branch 26.

Similarly to the third conveyor 19, the fourth conveyor 20 is looped around a driving pulley 27 and around a plurality of idle rollers 28 and 29, the rollers denoted 28 occupying fixed positions and the rollers denoted 29 mounted flexibly to respective spring elements 30.

The fourth conveyor 20 presents an active bottom branch 31 running in the direction of the arrow F in FIG. 2, and a top return branch 32.

The two active branches 25 and 31 presented respectively by the third and fourth conveyors 19 and 20 are mutually opposed for delimiting a channel through which packs are advanced from the storage magazine to the transfer point.

With reference to FIG. 1, the unit 2 further comprises a magazine 33 of multiple hopper type design, in which to store packets 3 releasable to the first conveyor 6 in a manner to be described in due course. A fifth belt conveyor 34 substantially of familiar type, not described here in detail, is positioned to coincide with an area 35 at which the packets 3 are released from the magazine 33 and serves to feed the selfsame packets 3 toward the third and fourth conveyors 19 and 20.

Referring to FIG. 2, the unit 2 comprises a pair of timing rollers 36 located between the third conveyor 19 and the first conveyor 6, positioned one on each side of the selfsame first conveyor 6; one only of the two rollers 36 is visible in the accompanying drawings.

The two rollers 36 are rotatable about mutually parallel axes A1, and set in motion by drive means (not indicated) in opposing directions of rotation.

Figure 3:
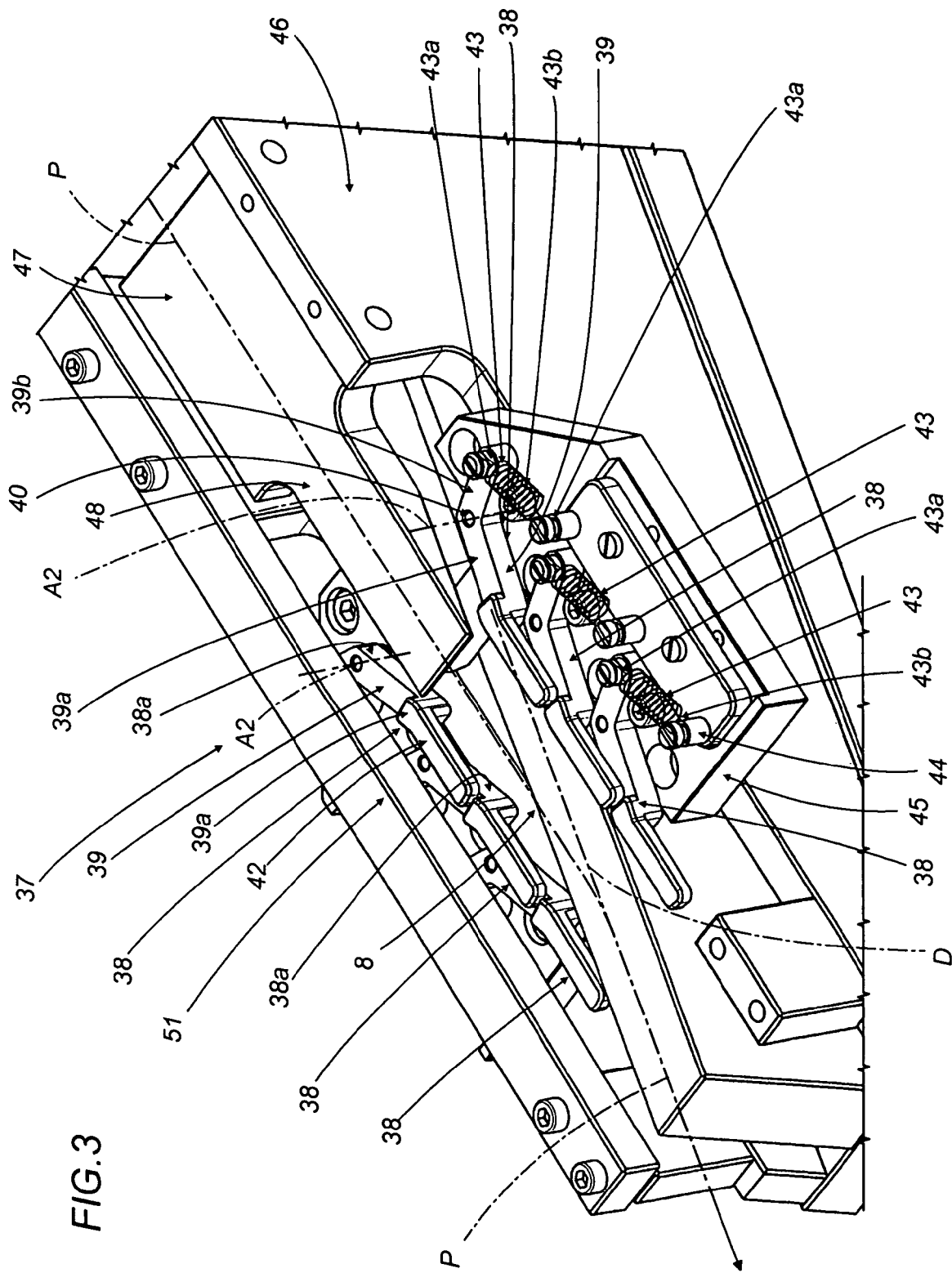
FIG. 3 shows a detail of the unit in FIG. 1, viewed in perspective from above and with certain parts omitted better to illustrate others.
Figure 4:
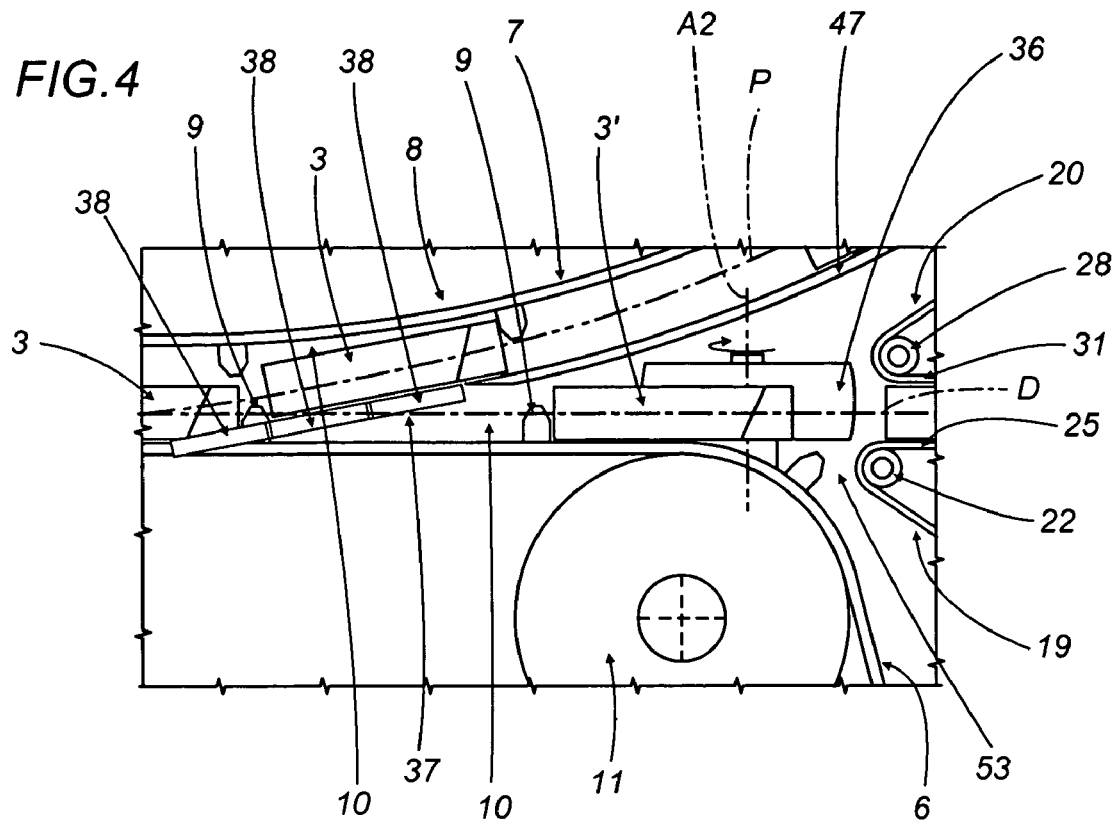
FIGS. 4 and 5 are respective schematic views showing a detail of the unit in FIGS. 1 and 2, in two different operating situations.
Figure 5:
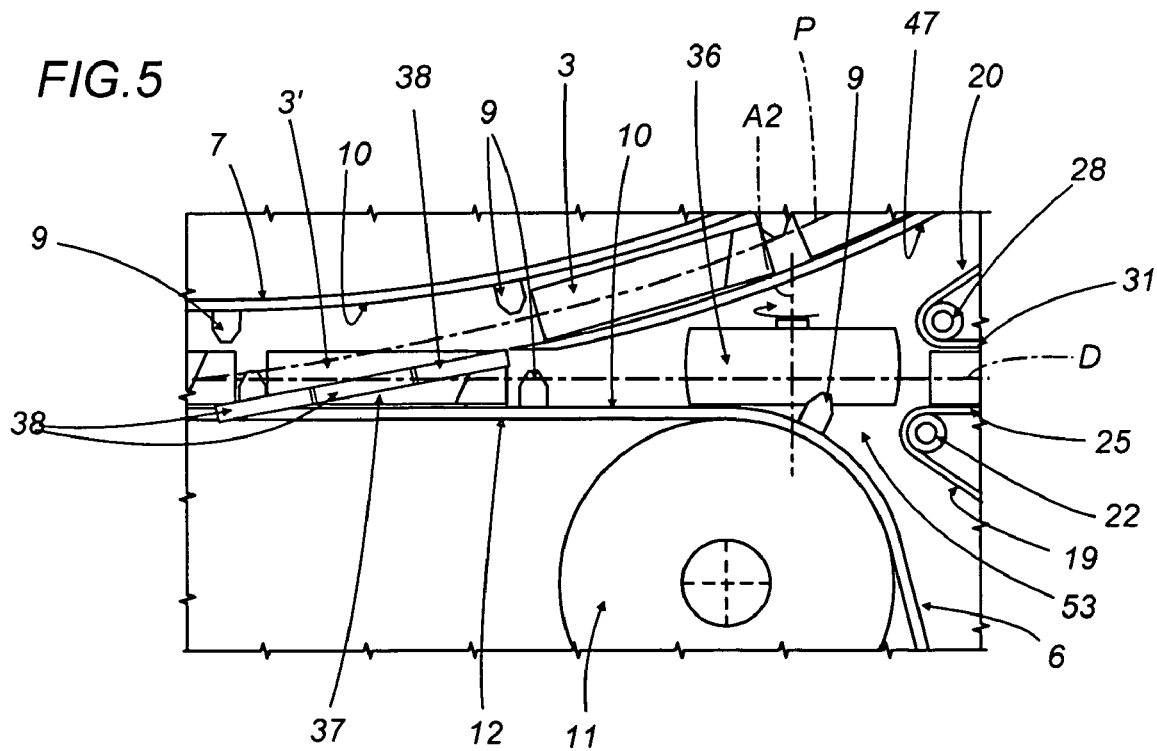

As discernible from the detailed illustration of FIG. 3, the unit 2 comprises a guide device 37 of which the purpose is to support and allow packets 3 coming from the second conveyor 7 to slide onto the first conveyor 6, while at the same time allowing packets 3 already on the first conveyor 6 to pass directly through the transfer point 8.

The guide device 37 includes a plurality of pairs of bridging members 38 angled downwardly along the feed path P followed by the packets 3 along the first conveyor 6.

Figure 6:
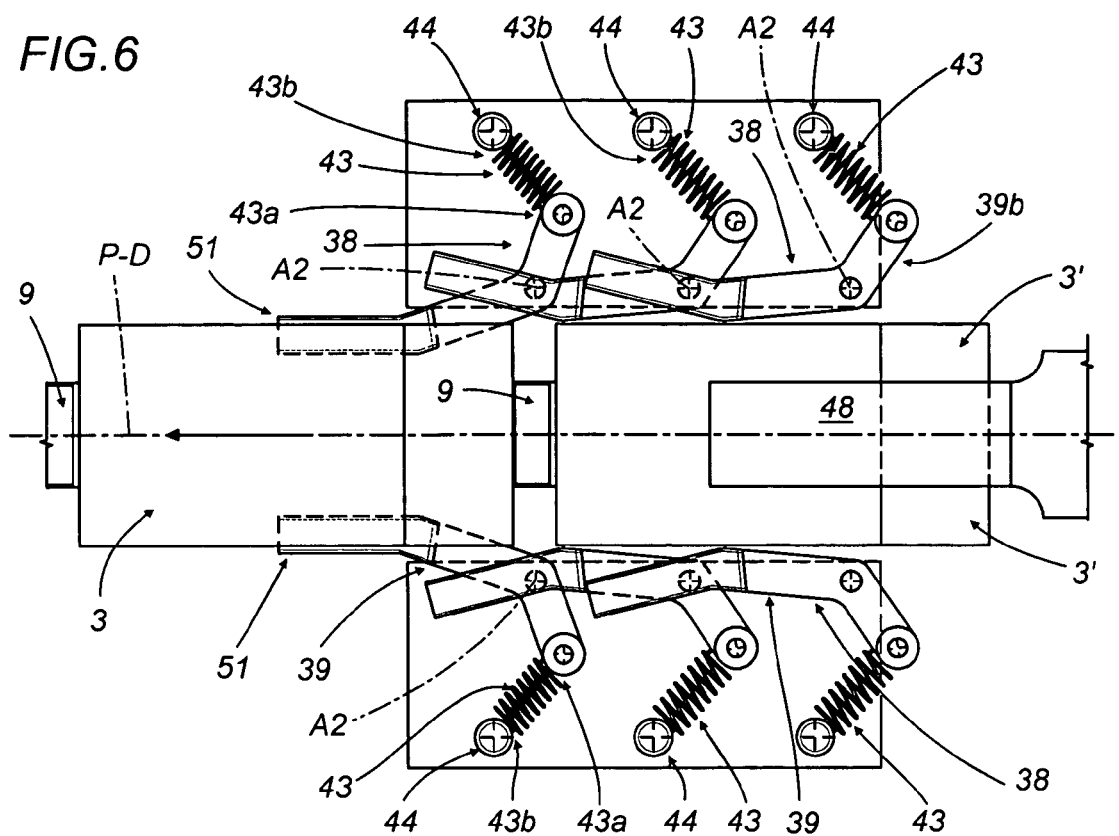
FIGS. 6 and 7 show a detail of the conveying unit according to the present invention, viewed in plan from above with certain parts omitted, and in two different operating situations.
Figure 7:
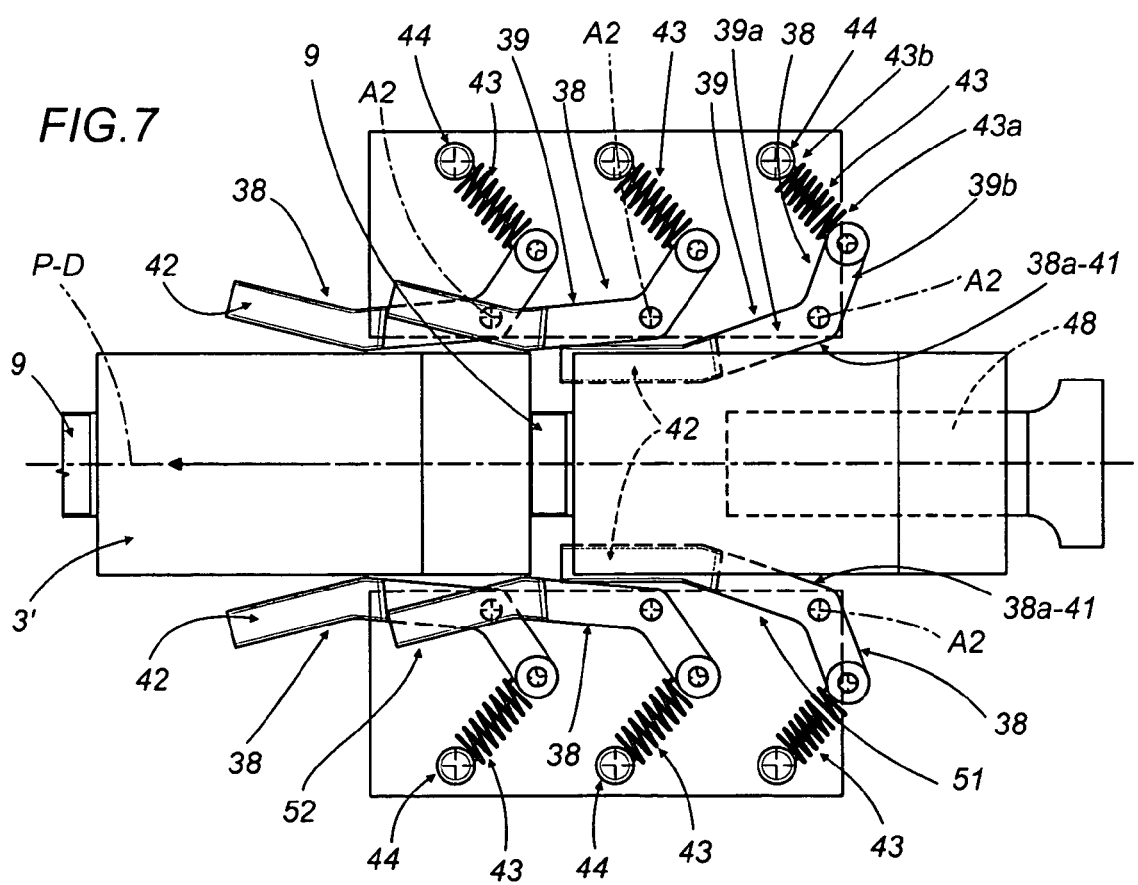

As illustrated to advantage in FIGS. 6 and 7, moreover, the two bridging members 38 of each pair are positioned respectively on opposite sides of the feed path P and present respective portions 38a converging on the selfsame path P.

In addition, the bridging members 38 are flexibly resilient when engaged, in a direction transverse to the rectilinear direction D aforementioned, by the advancing packets 3 carried in the pockets 10 of the first conveyor 6.

Each bridging member 38 is incorporated into a lever element 39 embodied as a rocker and mounted to a relative fulcrum pivot 40, capable of rocking thus on a respective axis A2 independently of all the other lever elements 39.

Each lever element 39 comprises a first arm 39a and a second arm 39b positioned on opposite sides of the pivot 40.

The first arm 39a presents a side face 41 placed to engage the packets 3 occupying the pockets 10 of the first conveyor 6, and a flat face 42 on which the packets 3 directed along the feed path P by the second conveyor 7 are supported and able to slide.

The aforementioned converging portion 38a is delimited by the side face 41, and thus forms a part of the first arm 39a presented by the lever element 39.

Anchored to the second arm 39b of each lever element 39 is a first end 43a of a coil spring 43, of which a second end 43b is anchored to a mounting element 44.

As illustrated in FIG. 3, the lever elements 39 are mounted sequentially in sets of three, each to a respective plate 45 carried in turn by a vertical bulkhead 46 of the frame (not illustrated) on which the conveying unit 2 is carried.

Observing FIGS. 2 and 3, the second conveyor 7 will be seen to comprise an element 47, extending along the descending segment 17, by means of which to guide and restrain the packets 3 advancing along the conveyor 7.

The guiding and restraining element 47 is offered to the descending segment 17 in such a manner as to keep each of the packets 3 lodged internally of the relative pocket 10, and terminates at the transfer point 8 in a tongue 48 adjacent to the bridging members 38 of the guidance device 37.

Positioned along the transport branch 15 of the second conveyor 7, at a given point upstream of the transfer point 8, is a proximity transducer 49 such as will verify the presence or absence of packets 3 in the respective pockets 10 of the conveyor 7.

The transducer 49 provides the conveying unit 2 with relative sensing means 50 serving to detect the presence of the packets 3.

The guide device 37 functions both as means 51 by which packets 3 advancing in the pockets 10 of the second conveyor 7 are slidably supported, and as means 52 by which packets 3 already advancing in the pockets 10 of the first conveyor 6 are afforded a passage through the transfer point 8.

The timing rollers 36 combine with the third conveyor 19 and the fourth conveyor 20 to provide the conveying unit 2 with placement means 53 by which packets 3 are directed into the pockets 10 of the first conveyor 6.

In addition, the conveying unit 2 will include a computerized master control unit (not illustrated) serving to manage the various operations performed by the unit 2.

In operation, single packets 3 emerging from the packer 5 are directed onto the horizontal upper segment 16 presented by the transport branch 15 of the second conveyor 6, each one being placed, by substantially familiar methods, in a respective pocket 10 delimited by the aforementioned ridges 9.

Thus, the packets 3 advance along the feed path P and down the descending segment 17 of the transport branch 15, supported by the guiding and restraining element 47, arriving ultimately at the point 8 of transfer to the first conveyor 6.

Passing from the second conveyor 7 to the first conveyor 6, the single packets 3 slide over the flat faces 42 of the lever elements 39 and locate in a respective pocket 10 presented by the top transport branch 12 of the first conveyor 6.

For a number of different reasons such as, for example, the rejection of defective packets 3 emerging from the cigarette packer 5, a pocket 10 of the second conveyor 7 may happen to contain no packet 3, in which case the empty space is detected by the aforementioned transducer 49 located along the feed path P, upstream of the transfer point 8, and a relative signal is sent to the computerized master control unit (not illustrated).

The computerized master control unit will pilot the placement means 53 to respond by preparing a recycled packet, denoted 3', in readiness to fill the pocket 10 of the first conveyor 6 that should have been occupied, had the missing packet 3 been transferred as normal from the second conveyor 7 to the first conveyor 6.

For this to occur, more exactly, the forwardmost of the packets 3' advanced by the third and fourth conveyors 19 and 20 is positioned in contact with the cylindrical surfaces of the timing rollers 36.

The timing rollers 36 are set in contrarotation at high speed about their respective axes A1, so that when contact is made with a recycled packet 3' fed forward by the third and fourth conveyors 19 and 20, the packet 3' is accelerated to the point of locating against one ridge 9 of a predetermined pocket 10 presented by the first conveyor 6.

The pocket 10 in question is precisely the one that would have been occupied by the packet 3 missing from the second conveyor 7.

As illustrated in FIG. 6, the aforementioned packet 3' is directed forward by a ridge 9 (not illustrated) of the corresponding pocket 10 and advanced along the feed direction D, to the point of engaging the lever elements 39 of the guide device 37.

Referring to FIGS. 6 and 7, as the recycled packet 3' makes contact with the side faces 41 of the single lever elements 39, the lever elements 39 are caused to pivot on their respective fulcrum axes A2, spreading substantially in a transverse direction to allow the passage of the packet 3' and then closing again immediately, returned by the action of the springs 43.

As illustrated in FIGS. 3, 6 and 7, the unit 2 is equipped with a plurality of the aforementioned lever elements 39, so that the section of the feed path P covered by the guide device 37 can be split between the selfsame levers, or rather between the relative flat faces 42; in other words, observing FIG. 7, whilst the lever elements 39 farthest downstream along the feed path P remain spread to allow the passage of a recycled packet 3', the elements 39 farthest upstream will already have been returned to the closed position by the action of the springs 43, in readiness to support another packet 3 advancing on the second conveyor 7. Self-evidently, in the event that two or more adjacent packets 3 may be missing on the second conveyor 7, the unit 2 is able to fill the gap by admitting two or more recycled packets 3' in succession.

Thus, by replenishing any vacant pockets 10 of the first conveyor 6 with recycled packets 3' fed directly onto the transport branch 12 of this same first conveyor 6, it becomes possible to maintain an unbroken succession of packets 3 downstream of the transfer point 8, each occupying a respective pocket 10 of the conveyor 6.

With a conveying unit 2 according to the present invention, advantageously, a first continuously driven conveyor 6 equipped with pockets 10 can be supplied with packets 3, through the agency of placement means 53, from a second continuously driven conveyor 7 also equipped with pockets 10, in such a way as to compensate any gaps presented by the second of the two conveyors.

In an alternative embodiment of the invention, not illustrated, packets 3 leaving the packer 5 could be fed by the conveying unit 2 directly to the first conveyor 6, with the aforementioned transducer 49 providing sensing means 50 located alongside the first conveyor 6 and the placement means 53 operating in conjunction with the second conveyor 7 so as to direct the recycled packets 3' onto this same second conveyor 7.

In other alternative embodiments of the present invention, likewise not illustrated, the coil type return springs 43 of the lever elements 39 might be replaced by other elements equivalent in terms of the art, such as pneumatic or electric actuators (not illustrated).

In another alternative embodiment of a conveying unit 2 according to the present invention, again not illustrated, the first and second conveyors 6 and 7 described and illustrated could be driven intermittently.

What is claimed is:

1. A unit for conveying packs of cigarettes to a user machine, comprising:
    a first conveyor with pockets for feeding a succession of packs, along a direction toward the user machine, the first conveyor having an endless conveying loop presenting a substantially horizontal top transport branch extending a long a feed direction and establishing one section of a feed path followed by the packs;
    a second conveyor with pockets for feeding packs, turned out by an upstream unit, onto the first conveyor at a transfer point, the second conveyor having an endless conveying loop located above the first conveyor and comprising a transport branch including a descending segment, and a substantially horizontal segment positioned facing the top transport branch of the first conveyor at least near the transfer point;
    a sensor, positioned along the second conveyor, for detecting a presence of packs in the pockets of the second conveyor;
    a storage magazine containing packs of cigarettes;
    a placement mechanism, interlocked to the sensor, for directing packs turned out by the storage magazine into pockets of the first conveyor corresponding to empty pockets of the second conveyor so as to obtain an unbroken succession of packs occupying the pockets of the first conveyor downstream of the transfer point;
    a guide mechanism, located at the transfer point, by which packs are directed from the pockets of the second conveyor into the pockets of the first conveyor, the guide mechanism both slidably supporting the packs occupying the pockets of the second conveyor, and affording a passage to the packs occupying the pockets of the first conveyor, wherein the guide mechanism comprises at least two bridging members angled downwardly along the feed path followed by the packs on the descending segment of the second conveyor, each bridging member being located on opposite sides of the feed path and comprising respective portions converging on the feed path that are flexibly resilient, in a direction transverse to the feed direction, when engaged by the advancing packs occupying the pockets of the first conveyor, wherein each bridging member is incorporated into a respective lever element able to rock on a respective fulcrum axis independently of each of the other lever elements, wherein each lever element presents a side face placed to engage successive packs occupying the pockets of the first conveyor, and an upper flat face on which packs advanced by the second conveyor are slidably supported.

2. A conveying unit as in claim 1, wherein each of the lever elements is embodied as a rocker and comprises a first arm incorporating the side and flat faces, and a second arm with which a spring mechanism is associated to oppose the rocking motion of the lever element.

3. A conveying unit as in claim 2, of which the guide mechanism comprises a plurality of lever elements located on each of the opposite sides of the feed path followed by the packs, wherein the lever elements on each side are ordered in series, in such a way as will allow two different lever elements on the same side to engage simultaneously with a pack advancing on the first conveyor and with a pack advancing on the second conveyor, respectively.

4. A conveying unit as in claim 3, wherein the placement mechanism comprises a pair of timing rollers by which packs are accelerated to the end of positioning each one in a respective pocket of the first conveyor.

5. A conveying unit as in claim 4, wherein the placement mechanism comprises a third conveyor by which the packs are directed toward the timing rollers.

6. A conveying unit as in claim 5, wherein the pockets of the first and second conveyors are delimited by ridges ordered along the developable length of each conveyor at a predetermined distance one from the next.

7. A unit for conveying packs of cigarettes to a user machine, comprising:
    a first conveyor with pockets for feeding a succession of packs toward the user machine;
    a second conveyor with pockets for feeding packs, turned out by an upstream unit, onto the first conveyor at a transfer point;
    a sensor, positioned along the first conveyor, for detecting a presence of packs in the pockets of the first conveyor;
    a storage magazine containing packs of cigarettes;
    a placement mechanism, interlocked to the sensor, for directing packs turned out by the storage magazine into pockets of the second conveyor for filling empty pockets in the first conveyor as indicated by the sensor to obtain an unbroken succession of packs occupying the pockets of the first conveyor downstream of the transfer point, wherein the placement mechanism comprises a pair of counter-rotating timing rollers by which packs are accelerated to position each in a respective pocket of the first conveyor.

8. A conveying unit as in claim 7, comprising a guide mechanism, located at the transfer point, by which packs are directed from the pockets of the second conveyor into the pockets of the first conveyor, wherein both the first conveyor and the second conveyor are driven continuously.

9. A conveying unit as in claim 7, comprising a guide mechanism, located at the transfer point, by which packs are directed from the pockets of the second conveyor into the pockets of the first conveyor, wherein both the first conveyor and the second conveyor are driven intermittently.

10. A conveying unit as in claim 7, comprising a guide mechanism, located at the transfer point, by which packs are directed from the pockets of the second conveyor into the pockets of the first conveyor.

11. A conveying unit as in claim 1, wherein the lever elements on each side are ordered in series, in such a way as will allow two different lever elements on the same side to engage simultaneously with a pack advancing on the first conveyor and with a pack advancing on the second conveyor respectively.

12. A conveying unit as in claim 1, wherein the placement mechanism comprises a pair of timing rollers by which packs are accelerated to the end of positioning each one in a respective pocket of the first conveyor.

13. A unit for conveying packs of cigarettes to a user machine, comprising:
    a first conveyor with pockets for feeding a succession of packs toward the user machine;
    a second conveyor with pockets for feeding packs onto the first conveyor at a transfer point;

a sensor, positioned along the second conveyor, for detecting a presence of packs in the pockets of the second conveyor;

a storage magazine containing packs of cigarettes;

a placement mechanism, interlocked to the sensor, for directing packs turned out by the storage magazine into pockets of the first conveyor corresponding to empty pockets of the second conveyor to obtain an unbroken succession of packs occupying the pockets of the first conveyor downstream of the transfer point;

a third conveyor and a fourth conveyor, placed between the storage magazine and the transfer point and having respective active branches mutually opposed for delimiting a channel through which packs are advanced from the storage magazine to the transfer point.

* * * * *